US008306061B2

(12) United States Patent
Lee et al.

(10) Patent No.: US 8,306,061 B2
(45) Date of Patent: Nov. 6, 2012

(54) METHOD FOR RETRANSMITTING DATA UNIT USING DELIVERY STATUS INFORMATION

(75) Inventors: Young-Dae Lee, Gyeonggi-Do (KR); Sung-Duck Chun, Gyeonggi-Do (KR); Sung-Jun Park, Gyeonggi-Do (KR); Seung-June Yi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 533 days.

(21) Appl. No.: 12/457,901

(22) Filed: Jun. 24, 2009

(65) Prior Publication Data

US 2009/0327830 A1 Dec. 31, 2009

Related U.S. Application Data (60) Provisional application No. 61/075,734, filed on Jun. 25, 2008.

(30) Foreign Application Priority Data

Jun. 3, 2009 (KR) .......................... 10-2009-0049202

(51) Int. Cl.
*H04J 3/24* (2006.01)

(52) U.S. Cl. ........ 370/473; 370/328; 370/342; 370/389; 714/748; 714/749; 714/751

(58) Field of Classification Search .................. 370/328, 370/329, 331, 389; 714/749, 748, 751
See application file for complete search history.

(56) References Cited

U.S. PATENT DOCUMENTS

| 2007/0177630 | A1* | 8/2007 | Ranta et al. ................... 370/473 |
| 2007/0214399 | A1* | 9/2007 | Lim et al. ....................... 714/746 |
| 2007/0274342 | A1* | 11/2007 | Kim et al. ...................... 370/473 |
| 2007/0280191 | A1* | 12/2007 | Jiang .............................. 370/345 |
| 2007/0283032 | A1* | 12/2007 | Kim et al. ...................... 709/230 |
| 2008/0043619 | A1* | 2/2008 | Sammour et al. ............. 370/231 |
| 2008/0209297 | A1* | 8/2008 | Chandra et al. ............... 714/748 |
| 2008/0298322 | A1* | 12/2008 | Chun et al. .................... 370/335 |
| 2008/0317017 | A1* | 12/2008 | Wiemann et al. ............. 370/389 |

* cited by examiner

*Primary Examiner* — Ricky Ngo
*Assistant Examiner* — Rasheed Gidado
(74) *Attorney, Agent, or Firm* — McKenna Long & Aldridge LLP

(57) ABSTRACT

Disclosed is a radio (wireless) communication system providing a radio communication service and a terminal, and more particularly, to a method for retransmitting protocol data unit upon receiving a HARQ delivery failure notification with respect to a particular RLC data PDU by a RLC, only if the RLC did not receive a positive response (i.e., ACK) with respect to the particular RLC data PDU from a previous RLC status PDU within an Evolved Universal Mobile Telecommunications System (E-UMTS) that has evolved from a Universal Mobile Telecommunications System (UMTS) or a Long Term Evolution (LTE) system.

8 Claims, 7 Drawing Sheets

METHOD FOR RETRANSMITTING DATA UNIT USING DELIVERY STATUS INFORMATION

CROSS-REFERENCE

The present application claims priority benefit to the following applications, which contents are all incorporated by reference herein: U.S. Provisional Application No. 61/075,734 (filed Jun. 25, 2008), Korean Application No. 10-2009-0049202 (filed Jun. 3, 2009).

TECHNICAL FIELD

The present invention relates to a radio (wireless) communication system providing a radio communication service and a terminal, and more particularly, to a method for retransmitting protocol data unit using Hybrid Automatic Repeat reQuest (HARQ) delivery failure notification provided from a Medium Access Control (MAC) layer in an Evolved Universal Mobile Telecommunications System (E-UMTS) that has evolved from a Universal Mobile Telecommunications System (UMTS) or a Long Term Evolution (LTE) system.

BACKGROUND ART

Figure 1:
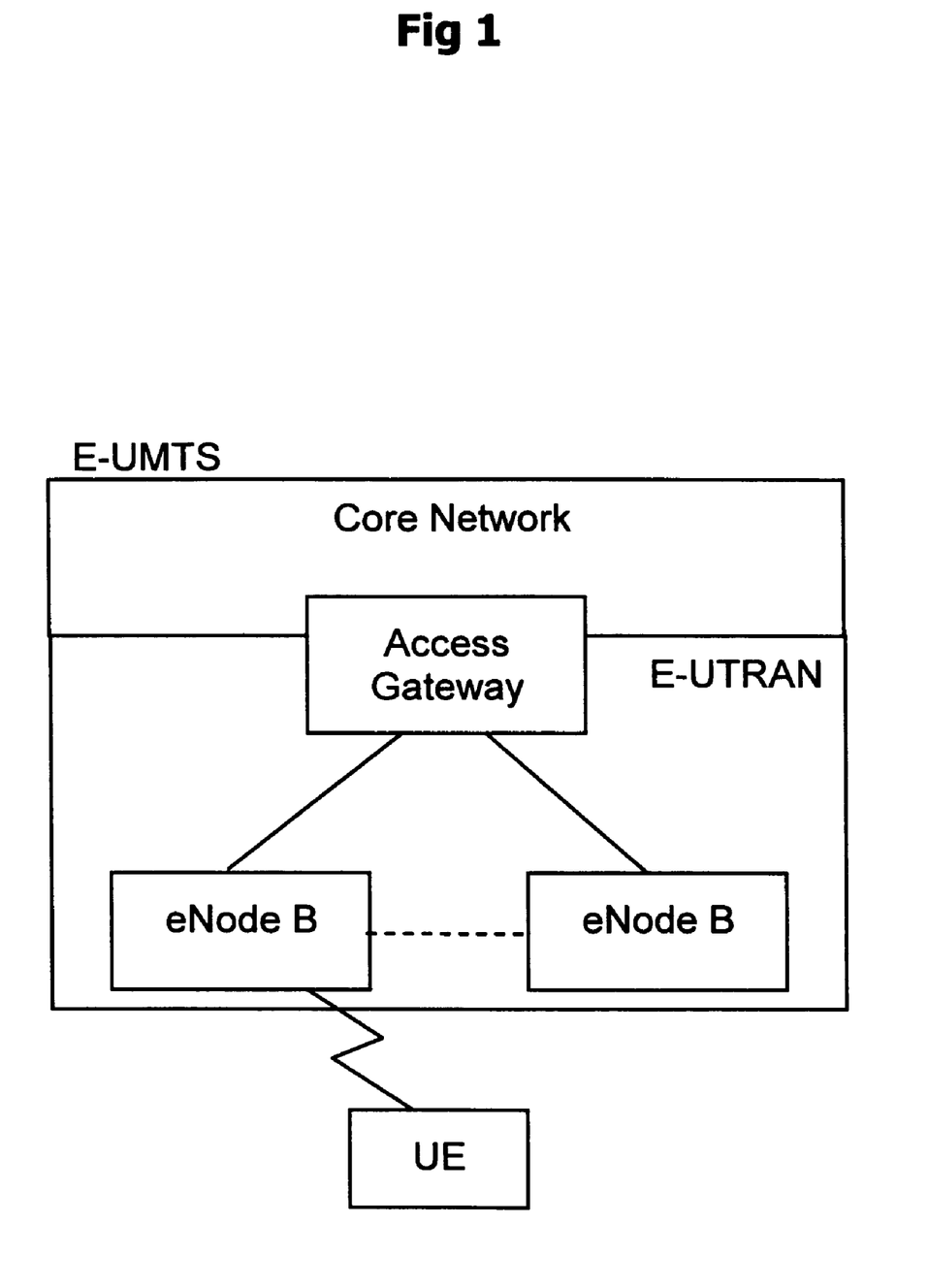
FIG. 1 shows an exemplary network structure of an Evolved Universal Terrestrial Radio Access Network (E-UTRAN) as a mobile communication system to which a related art and the present invention are applied.

FIG. 1 shows an exemplary network structure of a Long-Term Evolution (LTE) system as a mobile communication system to which a related art and the present invention are applied. The LTE system is a system that has evolved from the existing UMTS system, and its standardization work is currently being performed by the 3GPP standards organization.

The LTE network can roughly be divided into an Evolved UMTS Terrestrial Radio Access Network (E-UTRAN) and a Core Network (CN). The E-UTRAN is generally comprised of a terminal (i.e., User Equipment (UE)), a base station (i.e., Evolved Node B (eNode B)), an access gateway (aGW) that is located at an end of the network and connects with one or more external networks. The access gateway may be divided into a part that handles processing of user traffic and a part that handles control traffic. In this case, the access gateway part that processes the user traffic and the access gateway part that processes the control traffic may communicate with a new interface. One or more cells may exist in a single eNB. An interface may be used for transmitting user traffic or control traffic between eNBs. The CN may include the aGW and a node or the like for user registration of the UE. An interface for discriminating the E-UTRAN and the CN may be used.

Figure 2:
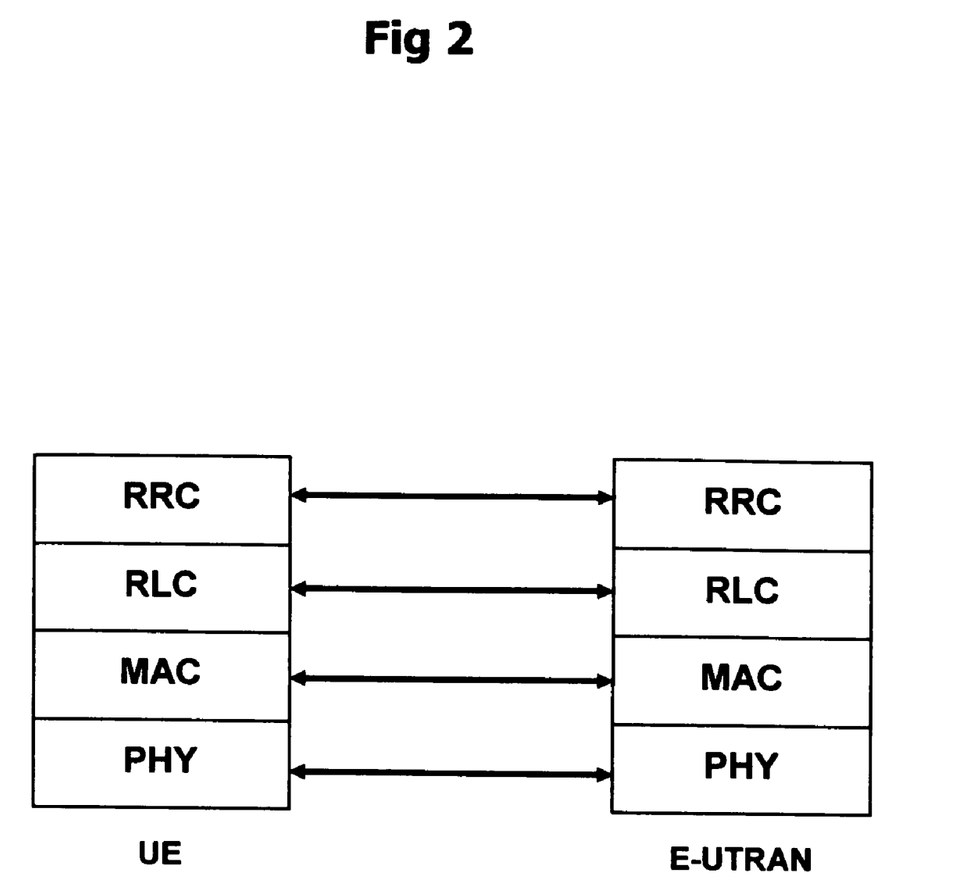
FIG. 2 is an exemplary view of related art control plane architecture of a radio interface protocol between a terminal and an E-UTRAN.
Figure 3:
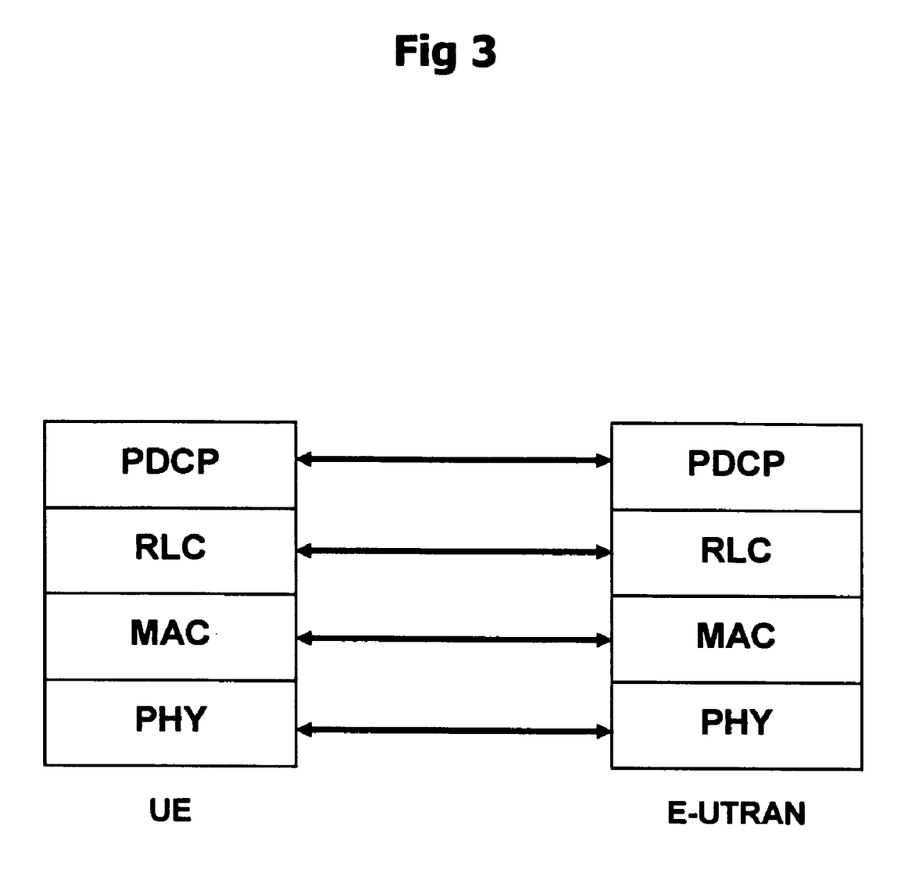
FIG. 3 is an exemplary view of related art user plane architecture of a radio interface protocol between a terminal and an E-UTRAN.

FIGS. 2 and 3 show respective exemplary structures of a radio interface protocol between the terminal and the E-UTRAN based on the 3GPP radio access network standards. The radio interface protocol has horizontal layers comprising a physical layer, a data link layer, and a network layer, and has vertical planes comprising a user plane (U-plane) for transmitting user data information and a control plane (C-plane) for transmitting control signaling. The protocol layers in FIGS. 2 and 3 can be classified into a first layer (L1), a second layer (L2), and a third layer (L3) based on three lower layers of an open system interconnection (OSI) standard model widely known in the communication system. The radio protocol layers exist as pairs between the UE and the E-UTRAN and handle a data transmission in a radio interface.

The layers of the radio protocol control plane in FIG. 2 and those of the radio protocol user plane in FIG. 3 will be described as follows.

The physical layer, the first layer, provides an information transfer service to an upper layer by using a physical channel. The physical layer is connected to an upper layer called a medium access control (MAC) layer via a transport channel. Data is transferred between the MAC layer and the physical layer via the transport channel. The transport channel is divided into a dedicated transport channel and a common transport channel according to whether or not a channel is shared. Between different physical layers, namely, between a physical layer of a transmitting side and that of a receiving side, data is transmitted via the physical channel using radio resources.

The second layer includes various layers. First, a medium access control (MAC) layer performs mapping various logical channels to various transport channels and performs logical channel multiplexing by mapping several logical channels to a single transport channel. The MAC layer is connected to an upper layer called a radio link control (RLC) layer by a logical channel. The logical channel is roughly divided into a control channel that transmits information of the control plane and a traffic channel that transmits information of the user plane according to a type of transmitted information.

A Radio Link Control (RLC) layer of the second layer segments and/or concatenates data received from an upper layer to adjust the data size so as for a lower layer to suitably transmit the data to a radio interface. In addition, in order to guarantee various Quality of Services (QoSs) required by each radio bearer (RB), the RLC layer provides three operational modes: a Transparent Mode (TM); an Unacknowledged Mode (UM); and an Acknowledged Mode (AM). In particular, the AM RLC performs a retransmission function through an Automatic Repeat and Request (ARQ) for a reliable data transmission.

A Packet Data Convergence Protocol (PDCP) layer of the second layer performs a function called header compression that reduces the size of a header of an IP packet, which is relatively large and includes unnecessary control information, in order to effectively transmit the IP packet such as an IPv4 or IPv6 in a radio interface having a narrow bandwidth. The header compression increases transmission efficiency between radio interfaces by allowing the header part of the data to transmit only the essential information. In addition, the PDCP layer performs a security function in the LTE system. The security function includes ciphering for preventing data wiretapping by a third party, and integrity protection for preventing data manipulation by a third party.

The Radio Resource Control (RRC) layer located at the lowermost portion of the third layer is defined only in the control plane, and controls a logical channel, a transport channel and a physical channel in relation to the configuration, reconfiguration, and release of radio bearers (RBs). In this case, the RBs refer to a logical path provided by the first and second layers of the radio protocol for data transmission between the UE and the UTRAN. In general, configuration (establishment, setup) of the RB refers to the process of stipulating the characteristics of a radio protocol layer and a channel required for providing a particular data service, and setting the respective detailed parameters and operational methods. The RBs include two types: a Signaling RB (SRB) and a Data RB (DRB). The SRB is used as a path for transmitting an RRC message on a C-plane, and the DRB is used as a path for transmitting user data on a U-plane.

In the related art, if a RLC (Radio Link Control) layer receives a negative acknowledgement (NACK) (i.e., delivery failure notification) with respect to a transmission of a particular RLC data PDU, the RLC layer retransmits a corresponding RLC data PDU after checking sequence number(s) of the corresponding RLC data PDU.

However, in a certain situation, there is case that the RLC layer receives a HARQ delivery failure notification with respect to a RLC data PDU that was received positively (i.e., ACK) based on a previous RLC status PDU. This case happens when there is an ACK-to-NACK error during a HARQ operation. In this case, the RLC data PDU must be retransmitted according to the related art because the retransmission of the RLC data PDU is basically determined by a report of the RLC status PDU. However, such retransmission of the RLC data PDU is unnecessary in case that there is an ACK-to-NACK error during the HARQ operation. As such, radio resources can be wasted because of such unnecessary retransmission of the RLC data PDU. Further, in the related art, if the acknowledged RLC data PDU by a RLC status PDU is erased from a transmitting side buffer, a retransmission of the RLC data PDU can not possibly performed even if the RLC receives the HARQ delivery failure notification. From this, the RLC protocol can be in a deadlock situation, which causes a great drawback in the related art.

DISCLOSURE OF THE INVENTION

Therefore, an object of the present invention is to minimize a number of unnecessary RLC data PDU retransmissions, to prevent a waste of radio resources during the RLC data PDU retransmission, and/or to prevent a deadlock situation during a delivery of RLC data PDUs.

For this, when a RLC entity or layer receives a HARQ delivery failure notification with respect to a particular RLC data PDU, the present invention proposes to retransmit a RLC data PDU only if the RLC entity or layer did not receive a positive response (i.e., ACK) with respect to the particular RLC data PDU from a previous RLC status PDU. In other words, in case that the positive response for the particular RLC data PDU was received from the previous RLC status PDU, the retransmission of the RLC data PDU is not performed.

To achieve this and other advantages and in accordance with the purpose of the present invention, as embodied and broadly described herein, there is provided a method of retransmitting a data unit in wireless communication system, the method comprising: transmitting the data unit to a peer receiving ARQ (Automatic Repeat Request) entity; receiving a delivery failure indication for the data unit from a transmitting HARQ (Hybrid Automatic Repeat Request) entity; determining whether a delivery status indication for the data unit was previously received from the peer receiving ARQ entity; and selectively retransmitting the data unit based on the determining step.

Also, to achieve this and other advantages and in accordance with the purpose of the present invention, as embodied and broadly described herein, there is provided a method of retransmitting a data unit in wireless communication system, the method comprising: transmitting the data unit to a peer entity in a receiving side; receiving a delivery failure indication for the data unit from a lower layer of a entity in a transmitting side; determining whether a delivery status indication for the data unit was previously received from the peer entity in the receiving side; and selectively retransmitting the data unit based on the determining step.

MODES FOR CARRYING OUT THE PREFERRED EMBODIMENTS

One aspect of this disclosure relates to the recognition by the present inventors about the problems of the related art as described above, and further explained hereafter. Based upon this recognition, the features of this disclosure have been developed.

Although this disclosure is shown to be implemented in a mobile communication system, such as a UMTS developed under 3GPP specifications, this disclosure may also be applied to other communication systems operating in conformity with different standards and specifications.

Hereinafter, description of structures and operations of the preferred embodiments according to the present invention will be given with reference to the accompanying drawings.

As described above, the present invention aims to minimize a number of unnecessary RLC data PDU retransmissions so as to prevent a waste of radio resources, and to prevent a RLC protocol from a deadlock situation during a delivery of RLC data PDUs.

To this end, when a RLC entity receives a HARQ delivery failure notification with respect to a particular RLC data PDU, the present invention proposes to perform a retransmission of a RLC data PDU only if the RLC entity did not receive a positive response (i.e., ACK) with respect to the particular RLC data PDU from a previous RLC status PDU.

In LTE system, a HARQ operation is performed in a MAC (Medium Access Control) layer for an effective data transmission. The following is a detailed description of the HARQ operation.

Figure 4:
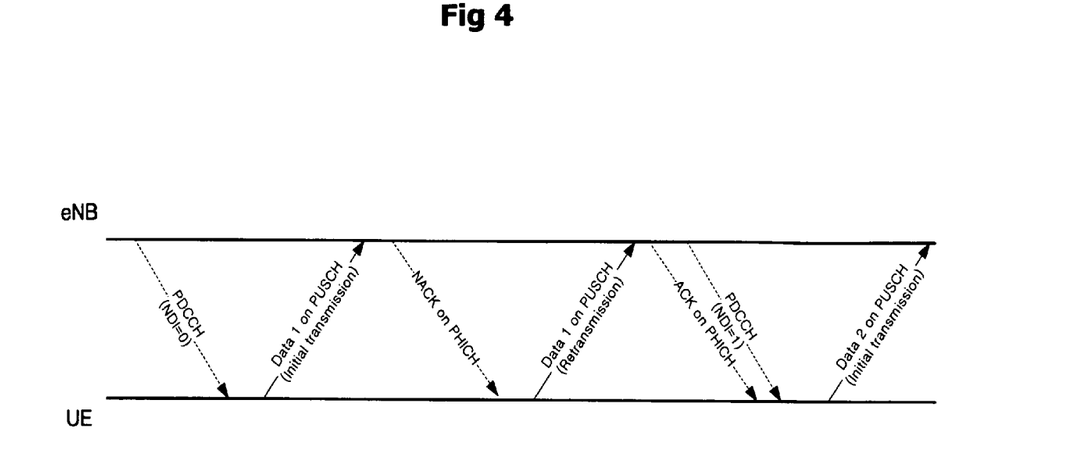
FIG. 4 is an exemplary Hybrid Automatic Repeat request (HARQ) operation between a UE and eNB.

FIG. 4 is an exemplary view showing a HARQ operation method for an effective data transmission. As illustrated in FIG. 4, a base station (or eNB) may transmit downlink scheduling information (referred as 'DL scheduling information' hereafter) through a PDCCH (Physical Downlink Control Channel) in order to provide data to a terminal (UE) during a HARQ operation. The DL scheduling information may include a UE identifier (UE ID), a UE group identifier (Group ID), an allocated radio resource assignment, a duration of the allocated radio resource assignment, a transmission parameter (e.g., Modulation method, payload size, MIMO related information, etc), HARQ process information, a redundancy version, or a new data indicator (NID), etc. Usually, the terminal (UE) performs multiple HARQ processes, the multiple HARQ processes are operated synchronously. Namely, each HARQ process is allocated synchronously in every transmission time interval (TTI). For example, a HARQ process 1 may perform in a first transmission time interval (TTI 1), a HARQ process 2 may perform in TTI 2, . . . , a HARQ process 8 may perform in TTI 8, the HARQ process 1 may again perform in TTI 9, and the HARQ process 2 may again perform in TTI 10, etc. Since the HARQ processes are allocated in synchronous manner, a certain HARQ process associated with a TTI which receives a PDCCH for initial transmission of a particular data may be used for such data transmission. For example, if the terminal receives a PDCCH including an uplink scheduling information in Nth TTI, the terminal may actually transmit a data in N+4 TTI.

The HARQ retransmission of the terminal is operated in a non-adaptive manner. That is, an initial transmission of a particular data is possible only when the terminal receives a PDCCH including an uplink scheduling information. However, the HARQ retransmission of the data can be possibly operated without receiving the PDCCH, as next TTI allocated to a corresponding HARQ process can be used with same uplink scheduling information. Here, transmission parameters may be transmitted through a control channel such as a PDCCH, and these parameters may be varied with a channel conditions or circumstances. For example, if a current channel condition is better than a channel condition of an initial transmission, higher bit rate may be used by manipulating a modulation scheme or a payload size. In contrast, if a current channel condition is worst than a channel condition of an initial transmission, lower bit rate may be used.

The terminal checks an uplink scheduling information by monitoring a PDCCH in every TTI. Then, the terminal transmits data through a PUSCH based on the uplink scheduling information. The terminal firstly generates the data in a MAC PDU format, and then stores it in a HARQ buffer. After that, the terminal transmits the data based on the uplink scheduling information. Later, the terminal waits to receive a HARQ feedback from a base station (eNB). If the terminal receives a HARQ NACK from the base station in response to the transmitted data, the terminal retransmits the data in a retransmission TTI of a corresponding HARQ process. If the terminal receives a HARQ ACK from the base station in response to the transmitted data, the terminal terminates to operate the retransmission of the HARQ. The terminal counts a number of transmissions (i.e. CURRENT_TX_NB) whenever the data is transmitted in a HARQ process. If the number of transmissions is reached to a maximum number of transmissions, which set by an upper layer, data in the HARQ buffer is flushed.

The HARQ retransmission is performed according to a HARQ feedback from a base station, a data existence in the HARQ buffer, or a transmission time of a corresponding HARQ process. Here, each of HARQ process may have a HARQ buffer respectively. The value in the NDI (New Data Indicator) field contained in the PDCCH may be used for the UE to determine whether the received data is an initial transmission data or a retransmitted data. More specifically, the NDI field is 1 bit field that toggles every time a new data is transmitted or received. (0->1->0->1-> . . . ) As such, the value in the NDI for the retransmitted data always has a same value used in an initial transmission. From this, the UE may know an existence of retransmitted data by comparing these values.

In general, during a HARQ operation processing, a data retransmission of a transmitting side is based on feedback information transmitted from a receiving side. Namely, the transmitting side performs data retransmission when a HARQ NACK is received from the receiving side, and the transmitting side prepares to send next (or new) data when a HARQ ACK is received from the receiving side. Here, the transmission of next data is performed when the next data that has to be transmitted is still existed in a buffer of the transmitting side and when a radio resource is allocated for such data transmission.

As explained above, the receiving side has to send a proper feedback to the transmitting side during the HARQ operation. However, in contrast to data transmission of other upper channels, a HARQ ACK/NACK signal contains simple content (i.e., Yes or No), and there is no additional error protection for transmitting the HARQ ACK/NACK signal in current technology. Therefore, transmission errors can be easily happened while the HARQ operation is performed. For example, the receiving side may send an ACK message to the transmitting side, but the transmitting side may receive or treat it as a NACK message, and vice versa. Because of these errors, an optimized HARQ operation can not be performed in current technology.

In case that the receiving side sends a HARQ NACK to the transmitting side, there is a NACK-to-ACK error if the transmitting side receives it as a HARQ ACK. In such situation, the receiving side still waits to receive a retransmission of data, whereas the transmitting side sends a new data instead of retransmitting of the data.

In case that the receiving side sends a HARQ ACK to the transmitting side, there is an ACK-to-NACK error if the transmitting side receives it as a HARQ NACK. In such situation, the transmitting side performs a retransmission of data, and the receiving side receives a duplicated data from the transmitting side, thereby wasting an unnecessary radio resource (s).

Hereinafter, the RLC layer will be explained in more detail. As mentioned above, the RLC layer operates in three modes, TM (Transparent Mode), UM (Unacknowledged Mode), and AM (Acknowledged Mode). Since the RLC layer performs a simple function in the TM, only the AM will be explained.

The re-transmission function is the main characteristic part of the AM RLC. The AM RLC aims to guarantee error-free data transmission using the re-transmission function. To this end, the AM RLC handles transmission of non-real time packet data such as TCP/IP of PS domain on the user plane, and transmits an RRC message that necessarily requires a reception acknowledgement among RRC message transmitted to a specific terminal in a cell on the control plane.

In terms of directionality, the UM RLC is used for unidirectional communications, while the AM RLC is used for bi-directional communications due to feedback from the receiving side. The UM RLC is different from the AM RLC in the aspect of configuration. The UM RLC and the AM RLC are different in terms of structural aspect: the UM RLC is that a single RLC entity has only one structure of transmission or reception but the AM RLC is that both a sending side and a receiving side exist in a single RLC entity.

The AM RLC is complicated due to its re-transmission function for data. The AM RLC is provided with a retransmission buffer as well as a transmission/reception buffer for retransmission management. The AM RLC performs many functions, e.g., usage of a transmission/reception window for flow control, polling to request a status information (status report) from a receiving side of a peer RLC entity by a sending side, a receiving side's status report informing about its buffer status to a sending side of a peer RLC entity, and generating of a status PDU to transmit status information, or the like. In order to support those functions, the AM RLC requires to have various protocol parameters, status variables, and timers. The PDUs used for controlling data transmission in the AM RLC, such as the status report, a status PDU, or the like, are called Control PDUs, and the PDUs used for transferring user data are called Data PDUs.

In the AM RLC, the RLC Data PDU is further divided into an AMD PDU and an AMD PDU segment. The AMD PDU segment has a portion of data belonging to the AMD PDU. In the LTE system, a maximum size of a data block transmitted by the terminal may vary at each transmission. For instance, having generated and transmitted an AMD PDU having a size of 200 bytes at a certain time period, a sending side AM RLC entity is required to retransmit the AMD PDU since it has received a NACK from a receiving side AM RLC. Here, if a maximum size of a data block which can be actually transmitted is assumed 100 bytes, the AMD PDU cannot be retransmitted in its original form. To solve this problem, the AMD PDU segments are used. The AMD PDU segments refer to the AMD PDU divided into smaller units. During such process, the sending side AM RLC entity divides the AMD DPU into the AMD PDU segments so as to transmit the same over a certain period of time. Then, the receiving side AM RLC entity decodes the AMD PDU from the received AMD PDU segments. If the receiving side AM RLC entity has a data that are not successfully received, the receiving side AM RLC entity may request the sending side AM RLC entity to retransmit the data. This may be called as a status report, and this may be transmitted using a status PDU among a control PDU.

Figure 5:
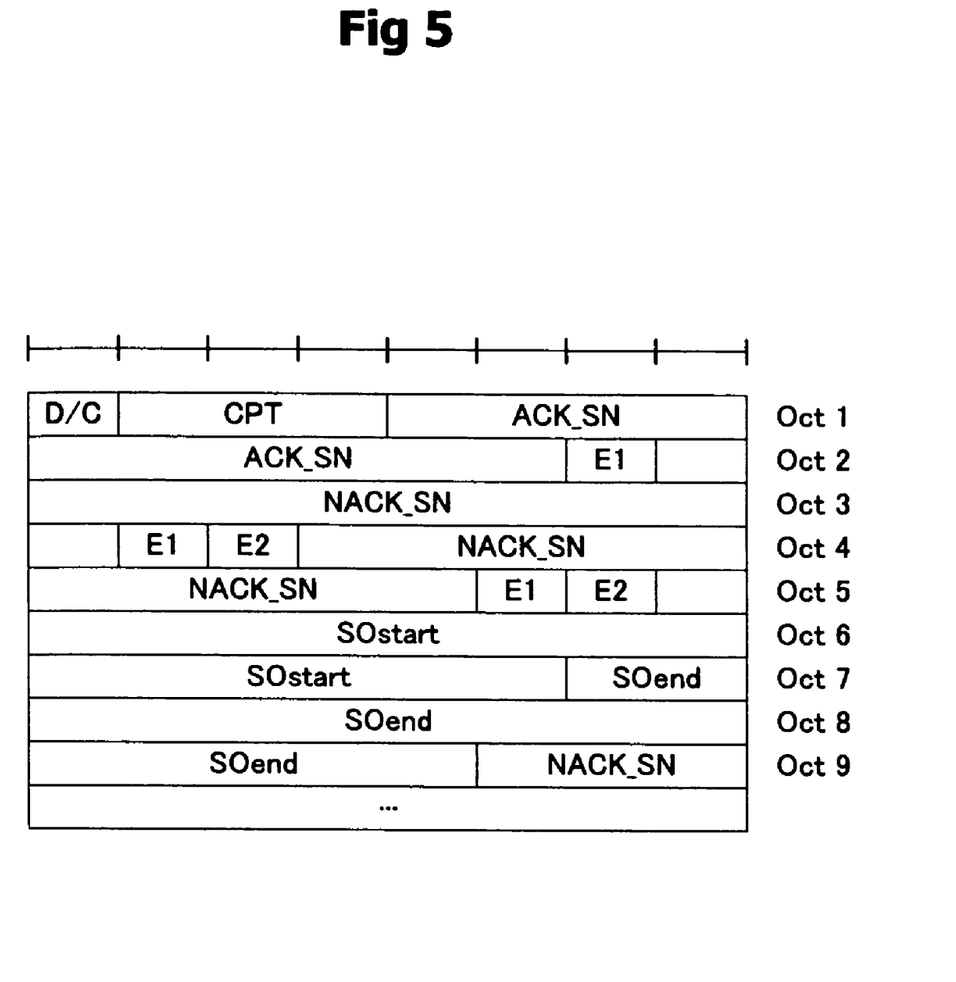
FIG. 5 is an exemplary status PDU (Protocol Data Unit) structure used in a LTE system.

FIG. 5 is an exemplary status PDU (Protocol Data Unit) structure used in a LTE system. In general, a status PDU consists of a status PDU payload and a RLC control PDU header, and the RLC control PDU header consists of a D/C field and a CPT field. Each field in the status PDU structure shown in the FIG. 5 can be described as following.

1) D/C (Data/Control): the D/C field indicates whether the RLC PDU is a RLC data PDU or RLC control PDU.
2) CPT (Control PDU Type): the CPT field indicates a type of the RLC control PDU.
3) ACK_SN (Acknowledgment Sequence Number): the ACK_SN field indicates the SN of the next not received RLC data PDU which is not reported as missing in the STATUS PDU. When the transmitting side of an AM RLC entity receives a STATUS PDU, it interprets that all AMD PDUs up to but not including the AMD PDU with SN=ACK_SN have been received by its peer AM RLC entity, excluding those AMD PDUs indicated in the STATUS PDU with NACK_SN and portions of AMD PDUs indicated in the STATUS PDU with NACK_SN, SOstart and SOend.
4) E1 (Extension 1): the E1 field indicates whether or not a set of NACK_SN, E1 and E2 follows.
5) NACK_SN (Negative Acknowledgment Sequence Number): the NACK_SN field indicates the SN of the AMD PDU (or portions of it) that has been detected as lost at the receiving side of the AM RLC entity.
6) E2 (Extension 2): the E2 field indicates whether or not a set of SOstart and SOend follows.
7) SOstart (Segment Offset Start) and SOend (Segment Offset End): the SOstart field indicates the position of the first byte of the portion of the AMD PDU in bytes within the Data field of the AMD PDU, and the SOend field indicates the position of the last byte of the portion of the AMD PDU in bytes within the Data field of the AMD PDU.

In AM RLC entity, a retransmission of data units is not randomly performed by the AM RLC. Rather, certain conditions must be met in order to initiate the retransmission of data units. This can be called as a retransmission trigger, and followings are defined in a current LTE system as the retransmission trigger.

(1) Negative Acknowledgement by a Status PDU from Peer AM RLC when a transmitting side AM RLC entity receives a status PDU from its peer AM RLC entity in a receiving side, the transmitting side AM RLC entity performs a retransmission of a RLC data PDU (i.e., AMD PDU or AMD PDU segment), which was not successfully received by the receiving side. Those unsuccessfully received RLC data PDUs by the receiving side are only retransmitted by the transmitting side AM RLC entity in order to prevent a waste of radio resources. Here, a NACK (Negative acknowledgement) signal is used to indicate those unsuccessfully received RLC data PDUs.

(2) HARQ Delivery Failure Notification from MAC when a transmitting side AM RLC entity delivers RLC data PDUs to a MAC layer (or entity) for a data radio transmission, the MAC entity generates a MAC PDU by performing a segmentation/concatenation of the received RLC data PDUs from the RLC entity. Thereafter, the MAC entity transmits the generated MAC PDU to a receiving side using a HARQ operation. Here, if a HARQ transmission of the MAC PDU is continuously failed and a number of the HARQ transmission reaches a threshold set by a RRC entity, the MAC entity consider it as a HARQ delivery failure. The HARQ delivery failure is then notified to all RLC entity transmitting RLC data PDUs included in the MAC PDU.

When the transmitting side AM RLC entity receives the HARQ delivery failure from its MAC entity, the transmitting side AM RLC entity determines it as a transmission failure of RLC data PDUs included in the MAC PDU, and then performs a retransmission for the RLC data PDUs. Here, Those RLC data PDUs indicated as the HARQ delivery failure by the MAC entity are only retransmitted in order to prevent a waste of radio resources.

When one of above described trigger conditions is happen, the AM RLC entity checks whether a transmission of a corresponding RLC data PDUs has been attempted, and checks whether the corresponding RLC data PDU has been successfully transmitted yet. After checking, if the attempted has been made but the transmission of the corresponding RLC data PDU has not been succeed, the AM RLC entity retransmits the RLC data PDUs. Here, a procedure text for above explanation can be expressed as following.

When receiving a negative acknowledgement for an AMD PDU or a portion of an AMD PDU by a STATUS PDU from its peer AM RLC entity, the transmitting side of the AM RLC entity shall:

if the SN of the corresponding AMD PDU falls within the range $VT(A)<=SN<VT(S)$:

consider the AMD PDU or the portion of the AMD PDU for which a negative acknowledgement was received for retransmission.

When receiving a negative acknowledgement for an AMD PDU or a portion of an AMD PDU by HARQ delivery failure notification from the transmitting MAC entity, the transmitting side of the AM RLC entity may:

if the SN of the corresponding AMD PDU falls within the range $VT(A)<=SN<VT(S)$:

consider the AMD PDU or the portion of the AMD PDU for which a negative acknowledgement was received for retransmission.

A detail description of state variable ($VT(A)$, $VT(S)$) will be given as following. When operating in AM mode, the RLC layer uses a state variable $VT(S)$ (Send state variable) to indicate the sequence number of the next RLC PDU (AMD PDU) to be transmitted for the first time, and a state variable $VT(A)$ (Acknowledgement state variable) to indicate the sequence number of the first in-sequence RLC PDU (AMD PDU) to be positively acknowledged by the receiver. Namely, VT(A) indicates a first sequence number of the RLC PDU that is determined to be not successfully transmitted by a transmitting side AM RLC entity. In general, when the MAC entity receives a NACK from a HARQ delivery failure notification with respect to a particular RLC data PDU, a receiving side AM RLC entity checks whether a sequence number of the RLC data PDU falls within the VT(A) and the VT(s) (i.e., VT(A)≦SN<VT(S)), and then retransmits the RLC data PUD if it falls.

Figure 6:
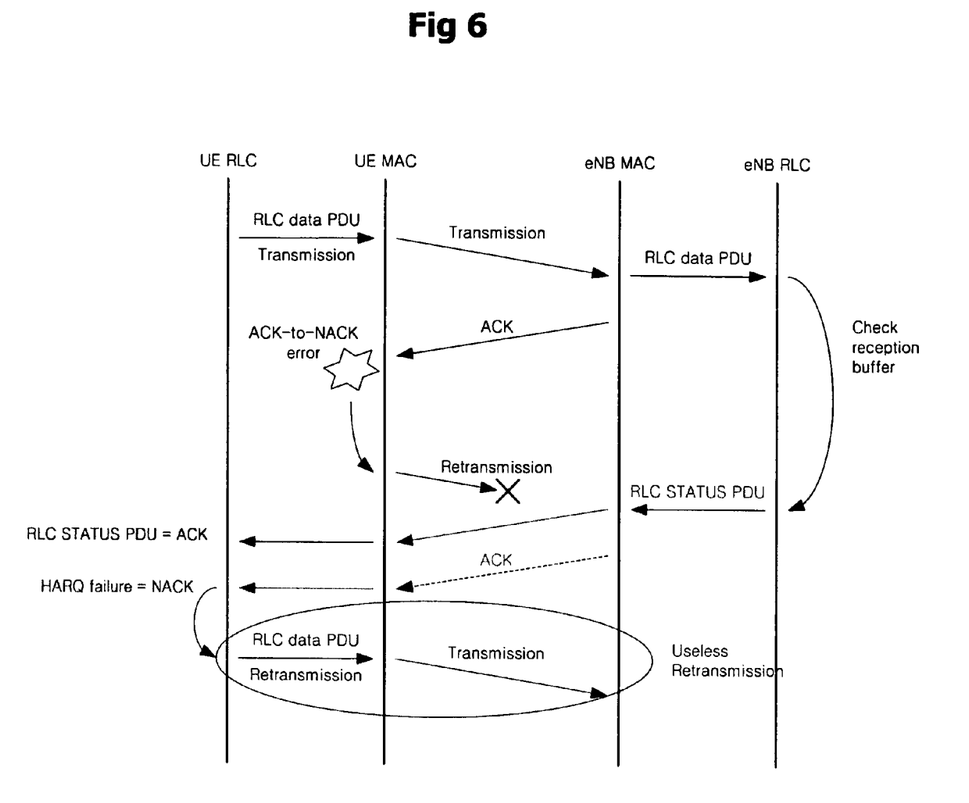
FIG. 6 is an exemplary data flow illustrating a RLC data PDU retransmission steps using a RLC status PDU and a HARQ delivery failure notification.

FIG. 6 is an exemplary data flow illustrating RLC data PDU retransmission steps using a RLC status PDU and a HARQ delivery failure notification.

As illustrated in FIG. 6, an ACK-to-NACK error may occur during a HARQ operation. Because of such ACK-to-NACK error, a RLC status PDU and HARQ transmission information may indicate different status information to each other. Specifically, as shown in FIG. 6, although previously received the RLC status PDU indicate an ACK, a HARQ delivery failure notification still can be received. In this specific situation, the present invention proposes to perform following procedure text. Based on the result from the following procedure text, a retransmission of RLC data PDU may be selectively performed. Here, the procedure text applied to the present invention can be given as following.

When receiving a negative acknowledgement for an RLC data PDU by HARQ delivery failure notification from the transmitting MAC entity, the transmitting side of the AM RLC entity shall:

if the SN of the corresponding RLC data PDU falls within the range VT(A)<=SN<VT(S):

if the RLC data PDU is already acknowledged by a previous STATUS PDU:

ignore the HARQ delivery failure notification, i.e., RLC does not perform retransmission of the RLC data PDU;

else if the RLC data PDU has not been acknowledged by a previous STATUS PDU:

consider the RLC data PDU for which a negative acknowledgement was received for retransmission;

else if the SN of the corresponding RLC data PDU falls outside of the range VT(A)<=SN<VT(S):

ignore the HARQ delivery failure notification, i.e., RLC does not perform retransmission of the RLC data PDU.

Namely, according to the present invention, an AM RLC entity may check whether a sequence number of a corresponding RLC data PDU received a HARQ delivery failure notification is falls within the VT(A) and VT(S) (i.e., VT(A) ≦SN<VT(S)) in order to determine a need of retransmission for the corresponding RLC data PDU. Also, the AM RLC entity may check whether an ACK was received from a previous status PDU with respect to the corresponding RLC data PDU. After the checking, only if a condition of VT(A) ≦SN<VT(S) is satisfied and the ACK was not received from the previous status PDU, the AM RLC entity may perform the retransmission of the corresponding RLC data PDU. If the condition of VT(A)≦SN<VT(S) is not satisfied or if the ACK was received from the previous status PDU, the received HARQ delivery failure notification is ignored and the RLC data PDU is not retransmitted.

Figure 7:
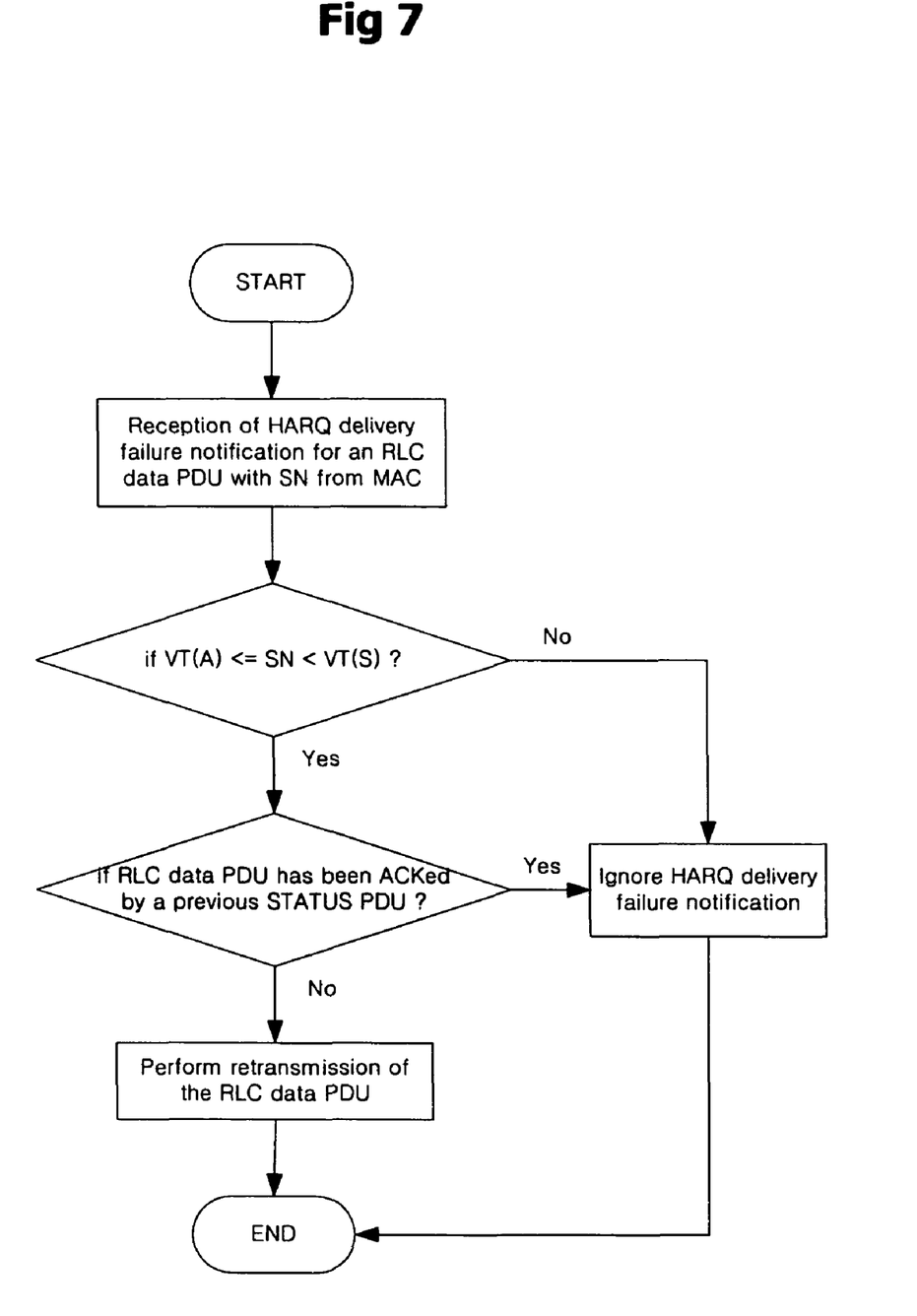
FIG. 7 is an exemplary data flow illustrating a RLC data PDU retransmission using a HARQ delivery failure notification according to the present invention.

FIG. 7 is an exemplary data flow illustrating a RLC data PDU retransmission using a HARQ delivery failure notification according to the present invention.

As illustrated in FIG. 7, firstly, an AM RLC entity receives a HARQ delivery failure notification for an RLC data PDU having a sequence number from a MAC entity. Then, a condition of VT(A)≦SN<VT(S) is checked. If such condition is not satisfied, the AM RLC entity ignores the received HARQ delivery failure notification and does not retransmit the RLC data PDU. If such condition is satisfied, then the AM RLC entity may check whether the RLC data PDU has been acknowledged by a previous status PDU. If the RLC data PDU has been acknowledged by the previous status PDU, then the AM RLC entity ignores the received HARQ delivery failure notification and does not retransmit the RLC data PDU. If the RLC data PDU has not been acknowledged by the previous status PDU, then the AM RLC entity performs the retransmission of the RLC data PDU.

According to the present invention, a HARQ delivery failure notification is ignored and a retransmission of a RLC data PDU is not performed if the HARQ deliver failure notification (i.e., NACK) is received after the RLC data PDU was positively acknowledged by the previous status PDU. However, there is another case that the RLC data PDU is not positively acknowledged (i.e., NACK) from the status PDU after receiving of a HARQ delivery successful notification (i.e., ACK) In this case, according to the present invention, the NACK signal from the status PDU is not ignored, and the RLC data PDU should be retransmitted. The main reason for the retransmission of the RLC data PDU is because of characteristic of the HARQ delivery notification. Usually, the HARQ delivery notification is information provided from a transmitting side MAC entity to a transmitting side RLC entity. And, there are many possibilities of HARQ errors (i.e., ACK-to-NACK error, NACK-to-ACK error) during the HARQ operation. Therefore, information provided from a peer entity such as a RLC status PDU has higher credibility than information related to the HARQ delivery notification. Therefore, a report of the RLC status PDU should be used in a great role as compared to the HARQ delivery notification.

According to the present invention, an AM RLC entity may determine a current status information as shown in a table 1, if the RLC status PDU and the HARQ delivery notification have status information different from each other.

TABLE 1

| 1st received info | 2nd received info | Determination |
| --- | --- | --- |
| HARQ delivery = Success | STATUS PDU = NACK | NACK |
| HARQ delivery = N/A | STATUS PDU = NACK | NACK |
| HARQ delivery = Fail | STATUS PDU = ACK | ACK |
| HARQ delivery = N/A | STATUS PDU = ACK | ACK |
| STATUS PDU = ACK | HARQ delivery = Fail | ACK |
| STATUS PDU = N/A | HARQ delivery = Fail | Could be NACK (possibly ACK-to-NACK error) |
| STATUS PDU = NACK | HARQ delivery = Success | Could be ACK (possibly NACK-to-ACK error in HARQ) |
| STATUS PDU = N/A | HARQ delivery = Success | Could be ACK (possibly NACK-to-ACK error in HARQ) |

As shown in the table 1, according to the present invention, when the AM RLC entity receives a RLC status PDU, regardless of previous HARQ transmission information, the AM RLC entity determines the current status information as an ACK or a NACK based on information from the RLC status PDU. On the other hand, if the HARQ transmission failure notification is received, the AM RLC entity checks whether there is formation received from a previous status PDU, if the information received form the previous status PDU exists, the AM RLC entity determines the current status information as the ACK or the NACK with consideration of both the status PDU and the HARQ transmission information.

Therefore, according to the present invention, when a RLC entity receives a HARQ delivery failure notification with respect to a particular RLC data PDU, a retransmission of a RLC data PDU is only performed when the RLC entity did not receive a positive response (i.e., ACK) with respect to the particular RLC data PDU from a previous RLC status PDU. In other words, in case that the positive response for the particular RLC data PDU was received from the previous RLC status PDU, the retransmission of the RLC data PDU is not performed. From this, a number of unnecessary RLC data PDU retransmissions may be minimized, a waste of radio resources during the RLC data PDU retransmission may be prevented, and a deadlock situation during a delivery of RLC data PDUs may be prevented.

The present disclosure may provide a method of retransmitting a data unit in wireless communication system, the method comprising: transmitting the data unit to a peer receiving ARQ (Automatic Repeat Request) entity; receiving a delivery failure indication for the data unit from a transmitting HARQ (Hybrid Automatic Repeat Request) entity; determining whether a delivery status indication for the data unit was previously received from the peer receiving ARQ entity; and selectively retransmitting the data unit based on the determining step, wherein the delivery failure indication from the transmitting HARQ entity is ignored, if the delivery status indication from the peer receiving ARQ entity indicates a successful delivery, the data unit is retransmitted to the peer receiving ARQ entity, if the delivery status indication from the peer receiving ARQ entity indicates an unsuccessful delivery or if the delivery status indication from the peer receiving ARQ entity does not exist, the peer receiving ARQ entity is a peer Radio Link Control (RLC) entity in a receiving side, the transmitting HARQ entity is a RLC entity in a transmitting side, the delivery failure indication is a HARQ delivery failure notification, and the delivery status indication is a status PDU (Protocol Data Unit).

It can be also said that the present disclosure may provide a method of retransmitting a data unit in wireless communication system, the method comprising: transmitting the data unit to a peer entity in a receiving side; receiving a delivery failure indication for the data unit from a lower layer of a entity in a transmitting side; determining whether a delivery status indication for the data unit was previously received from the peer entity in the receiving side; and selectively retransmitting the data unit based on the determining step, wherein the delivery failure indication from the entity in the transmitting side is ignored, if the delivery status indication from the peer entity in the receiving side indicates a successful delivery, the data unit is retransmitted to the peer entity in the receiving side, if the delivery status indication from the peer entity in the receiving side indicates an unsuccessful delivery or if the delivery status indication from the peer entity in the receiving side does not exist, the lower layer of the entity in the transmitting side is a MAC (Medium Access Control) layer, an operation of the delivery failure indication is performed by the MAC layer, the peer entity in the receiving side is a peer Radio Link Control (RLC) entity, the entity in the transmitting side is a RLC entity, the delivery failure indication is a HARQ delivery failure notification, and the delivery status indication is a status PDU (Protocol Data Unit).

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method of retransmitting a data unit in wireless communication system, the method comprising:
transmitting the data unit to a peer receiving ARQ (Automatic Repeat Request) entity;
receiving a delivery failure indication for the data unit from a transmitting HARQ (Hybrid Automatic Repeat Request) entity;
wherein the delivery failure indication is a HARQ delivery failure notification;
determining whether a delivery status indication for the data unit was previously received from the peer receiving ARQ entity,
wherein the delivery status indication is a status PDU (Protocol Data Unit); and
selectively retransmitting the data unit based on the determining step,
wherein if the delivery status indication from the peer receiving ARQ entity indicates a successful delivery, the delivery failure indication from the transmitting HARQ entity is ignored such that the unnecessary retransmission of the data unit can be prevented due to an ACK-to-NACK error, and
wherein the data unit is retransmitted to the peer receiving ARQ entity, if the delivery status indication from the peer receiving ARQ entity indicates an unsuccessful delivery or if the delivery status indication from the peer receiving ARQ entity does not exist.

2. The method of claim 1, wherein the peer receiving ARQ entity is a peer Radio Link Control (RLC) entity in a receiving side.

3. The method of claim 1, wherein the transmitting HARQ entity is a RLC entity in a transmitting side.

4. A method of retransmitting a data unit in wireless communication system, the method comprising:
   transmitting the data unit to a peer entity in a receiving side;
   receiving a delivery failure indication for the data unit from a lower layer of an entity in a transmitting side;
   wherein the delivery failure indication is a HARQ delivery failure notification;
   determining whether a delivery status indication for the data unit was previously received from the peer receiving ARQ entity;
   wherein the delivery status indication is a status PDU (Protocol Data Unit); and
   selectively retransmitting the data unit based on the determining step,
   wherein if the delivery status indication from the peer entity in the receiving side indicates a successful delivery, the delivery failure indication from the entity in the transmitting side is ignored such that the unnecessary retransmission of the data unit can be prevented due to an ACK-to-NACK error, and
   wherein the data unit is retransmitted to the peer receiving ARQ entity, if the delivery status indication from the peer receiving ARQ entity indicates an unsuccessful delivery or if the delivery status indication from the peer receiving ARQ entity does not exist.

5. The method of claim 4, wherein the lower layer of the entity in the transmitting side is a MAC (Medium Access Control) layer.

6. The method of claim 5, wherein an operation of the delivery failure indication is performed by the MAC layer.

7. The method of claim 4, wherein the peer entity in the receiving side is a peer Radio Link Control (RLC) entity.

8. The method of claim 4, wherein the entity in the transmitting side is a RLC entity.

* * * * *